Sept. 4, 1923.
P. J. RIVERS
WHEEL RIM CONTRACTING DEVICE
Filed Jan. 17, 1923
1,467,068
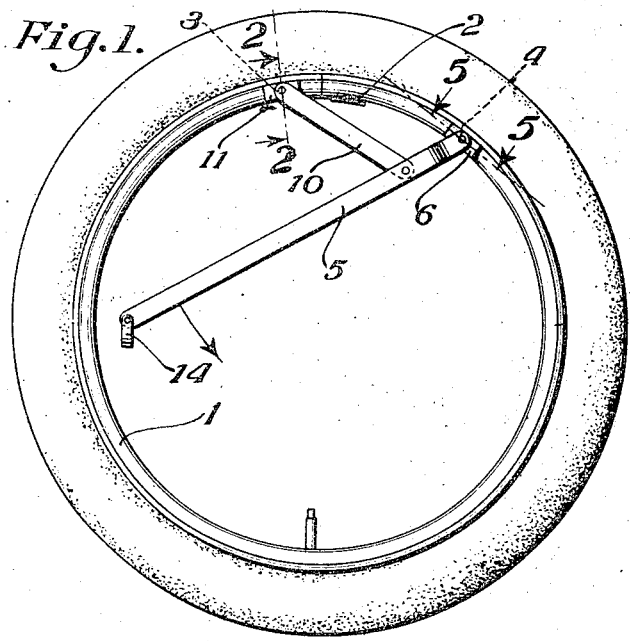
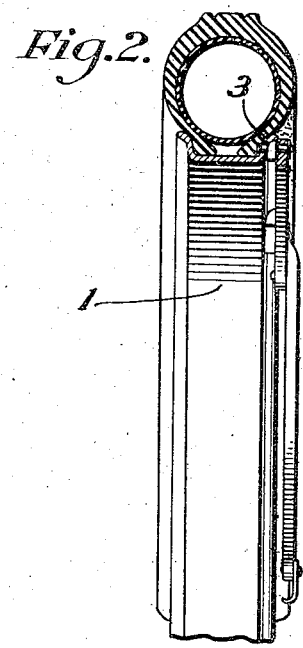
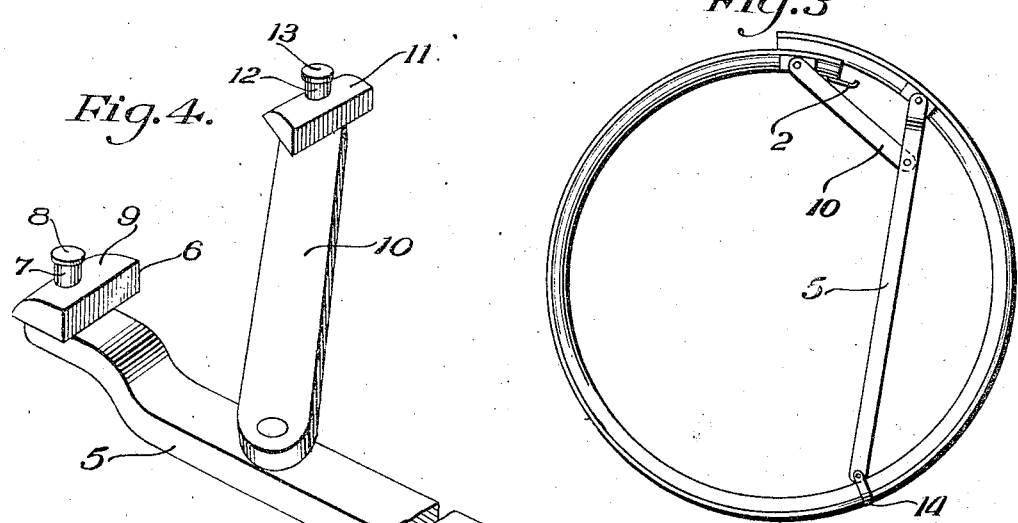
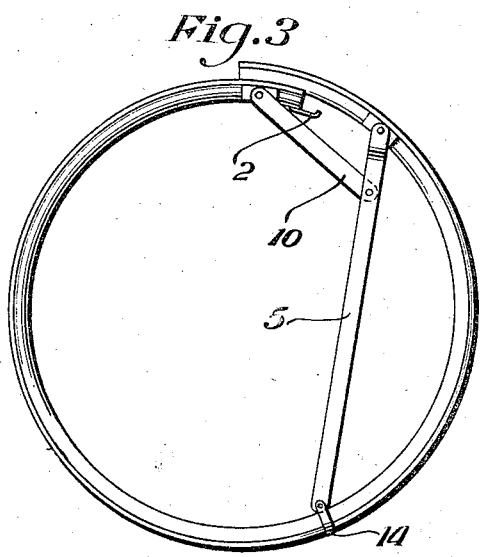
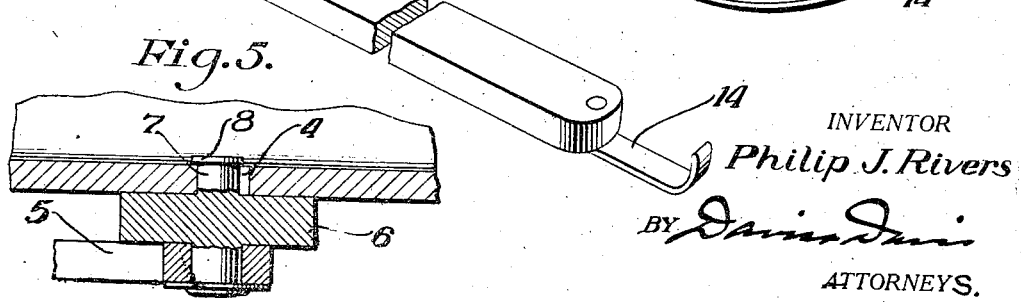
INVENTOR
Philip J. Rivers
BY
ATTORNEYS.

Patented Sept. 4, 1923.

1,467,068

UNITED STATES PATENT OFFICE.

PHILIP J. RIVERS, OF NEW ROCHELLE, NEW YORK.

WHEEL-RIM-CONTRACTING DEVICE.

Application filed January 17, 1923. Serial No. 613,177.

*To all whom it may concern:*

Be it known that I, PHILIP J. RIVERS, a citizen of the United States, and resident of the city of New Rochelle, in the county of Westchester and State of New York, have invented certain new and useful Improvements in Wheel-Rim-Contracting Devices, of which the following is a specification.

It is a common practice in automobile repair shops to contract demountable rims in order to release the tire shoe and to permit it to be readily removed. The contracted rim is rigidly held in order that a new shoe may be readily placed thereon. The machine usually used for contracting these demountable rims is a heavy contrivance suitable only as a part of a shop equipment.

It is the object of this invention to provide a small portable and collapsible tool adapted especially for use in contracting the wheel rim in order to release the shoe. It is a further object of the invention to provide means whereby the device may be used to lock the rim in its contracted condition so that the tire shoe may be readily removed therefrom and a new one replaced thereon, the locking device being such that it may be readily released to permit the rim to expand and return to its normal condition in engagement with the shoe.

In the drawing, Fig. 1 is a side elevation of a demountable rim with a shoe thereon, the contracting device being applied thereto;

Fig. 2 a transverse sectional view of the wheel rim and shoe taken on the line 2—2 of Fig. 1;

Fig. 3 a side elevation of the rim contracted and locked in its contracted condition;

Fig. 4 a perspective view of the contracting device; and

Fig. 5 a sectional view taken on the line 5—5 of Fig. 1.

Referring to the various parts by numerals, 1 designates the wheel rim which may be of any suitable form of the split demountable type. The ends of the rim are usually locked together by a device indicated at 2 in Fig. 1. This locking device may be of any suitable form. These locking devices are readily detachable to permit the rim to be contracted. The wheel rim is provided with an aperture 3 placed quite close to one end of the rim. An aperture 4 is formed in the rim near the other end thereof, said aperture 4 being placed a considerable distance from the adjacent end of the rim.

The contracting device consists of a long lever 5 carrying a pivoted shoe 6 at one end thereof. Said shoe 6 is provided with a rigid stud 7 which is adapted to be passed inwardly through the aperture 4 in the rim. This rigid stud is formed with a locking flange 8 on its end, said locking flange being adapted to be passed inwardly through aperture 4 in the rim to lock over the rim as indicated in Fig. 5. The shoe 6 is rounded on one corner as indicated at 9 in Fig. 4 to permit the shoe to fit closely against the curved outer surface of the rim.

Pivotally connected to the lever 5, a short distance from the shoe 6, is a link 10 and on the free end of this link is pivotally mounted a shoe 11, said shoe corresponding in shape with the shoe 6 and being adapted to fit closely against the outer curved surface of the rim. The shoe 11 is provided with a rigid stud 12 and the end of said stud is formed with a locking flange 13. The flanged stud 12 is adapted to be passed inwardly through the aperture 3 in the rim, as indicated in Fig. 2 of the drawing.

When the device is applied to a wheel rim, as shown in Fig. 1, with the stud 7 engaging with the aperture 4 and the stud 12 enengaging in the aperture 3, the rim may be contracted by swinging the lever 5 in the direction indicated by the arrow in Fig. 1. When power is applied to the lever 5 the shoe 6 will move slightly on the rim and cause the locking flange 8 to engage under the wheel rim, as indicated in Fig. 5. The pull applied to the shoe 11 through the link 10 will cause said shoe to slide and bring the flange 13 into locking engagement with the rim. The power applied to the end of the lever 5 will pull the shoe 11 and the end of the rim to which it is attached inwardly and carry it inside of the other end of the rim, as indicated in Fig. 3, thereby contracting the rim and freeing the shoe therefrom. It will, of course, be understood that the locking device 2 must be released before the rim can be contracted.

A locking hook 14 is pivoted on the end of the lever 5 and is adapted to be brought into engagement with the wheel rim, when the rim is contracted and the lever 5 has completed its movement, to thereby lock the rim in its contracted condition. It is manifest that when the rim is contracted it will tend to return to its normal condition and will thereby put a strain on the link 10 and through said link on the lever 5. This strain will cause the hook 14 to bind against the rim and thereby lock the device in position to hold the rim contracted. When the hook 14 is released the rim will return to its normal position and the flanged studs 7 and 12 may be readily removed from the apertures in the rim. The shoes 6 and 11 give a broad and snug bearing on the rim, and when they are locked thereto they prevent any distortion of the rim due to the strain put thereon. They also serve to assist in holding the flanged pins in engagement with the rim.

It is manifest that a tool constructed as shown and described may be readily folded or collapsed and is therefore adapted to be carried in an ordinary tool box. It is also clear that such a device may be used in a shop or carried as a part of the tool equipment of an automobile.

What I claim is:

1. A device of the character described comprising a lever, a shoe pivotally mounted on the end of said lever, a rigid pin carried by said shoe, a link pivotally connected to said lever adjacent to said shoe, and a shoe pivotally mounted on the end of said link and carrying a rigid pin one side of said shoe being shaped to fit the rim flange and the other side having a plane surface normal to the pin.

2. A device of the character described comprising a lever, a shoe pivotally mounted on the end of said lever, a rigid pin carried by said shoe, a link pivotally connected to said lever adjacent to said shoe, a shoe pivotally mounted on the end of said link and carrying a rigid pin, and locking flanges formed on the ends of said pins one side of each of said shoes being shaped to fit the rim flange and the other side having a plane surface normal to the pin.

3. A wheel rim contracting device, a shoe having a curved face conforming to and adapted to fit against the rim flange, a pin carried by said shoe, said pin projecting from the rim engaging surface of the shoe and being adapted to enter an aperture in the wheel rim, a locking flange formed on the end of the pin, and a pivot stud projecting from the opposite or outer face of the shoe in alinement with the pin and connecting said shoe to the rim contracting device.

In testimony whereof I hereunto affix my signature.

PHILIP J. RIVERS.